Oct. 16, 1951　　　L. R. LUDWIG ET AL　　　2,571,907
CONVERTIBLE MOTOR
Filed Aug. 15, 1946
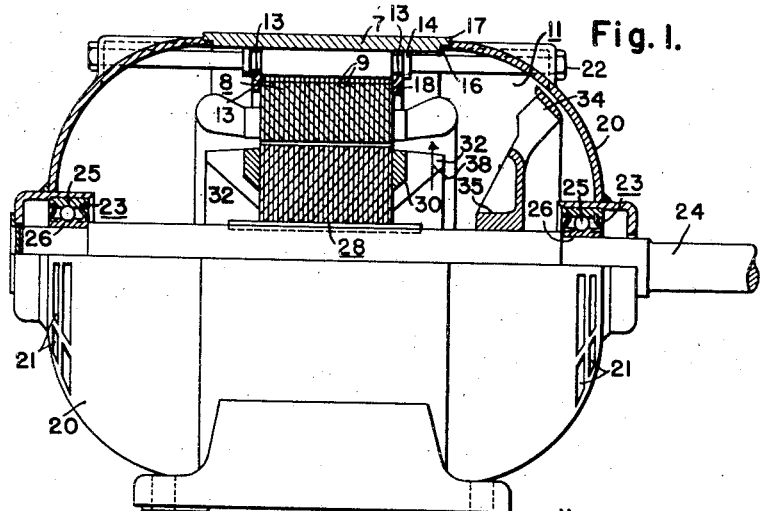
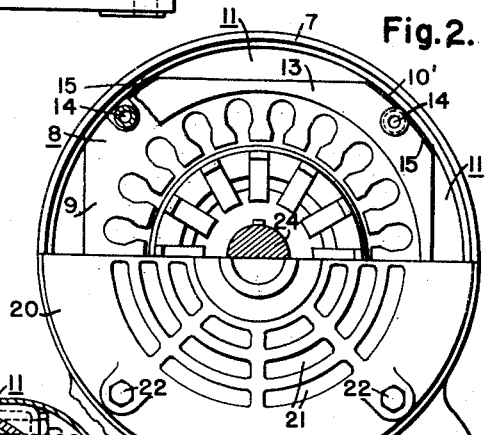
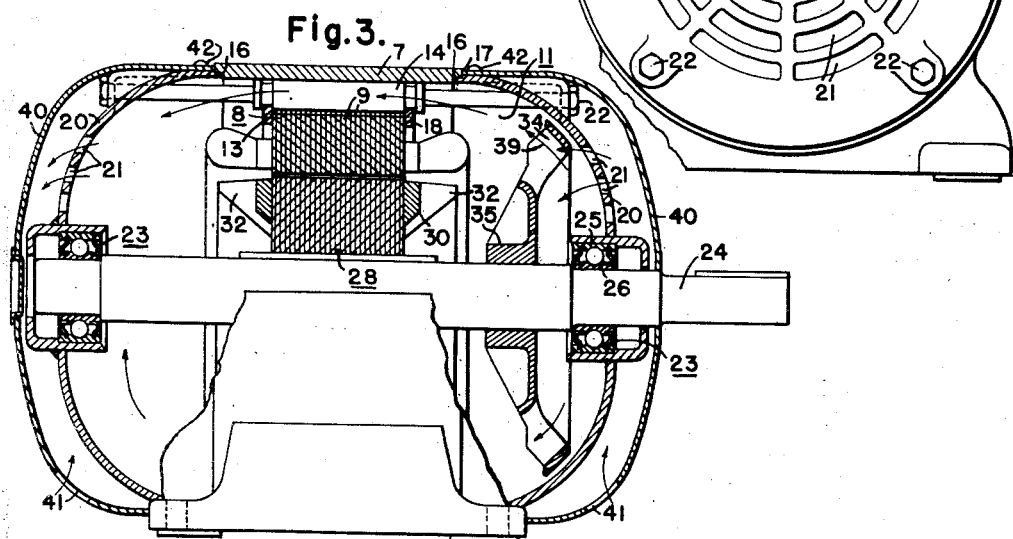
WITNESSES:
INVENTORS
Leon R. Ludwig, Theodore C. Fockler,
William H. Formhals & Howard T. Walton.
BY
ATTORNEY Patented Oct. 16, 1951

2,571,907

UNITED STATES PATENT OFFICE 2,571,907

CONVERTIBLE MOTOR

Leon R. Ludwig, Theodore C. Fockler, and William H. Formhals, Buffalo, N. Y., and Howard T. Walton, Pittsburgh, Pa., assignors to Westinghouse Electric Corporation, East Pittsburgh, Pa., a corporation of Pennsylvania Application August 15, 1946, Serial No. 690,628

1 Claim. (Cl. 171—252)

Our invention relates to electric motors, and more particularly to a redesigned line of induction motors, which have the advantages of extreme simplicity and economy of construction, a pleasing appearance, a small size, within the standardization-limits established by the industry, and complete convertibility into a maximum number of motor-types with a minimum number of parts.

A principal object of our invention is to provide a convertible motor having a stator member, a rotor member, and interchangeable complementary parts, including brackets, fans and hoods, whereby an open or protected motor, such as a drip-proof motor, may be readily converted into a fan-cooled motor, as covered in our divisional application Serial No. 213,091, filed February 28, 1951, and whereby a drip-proof motor may be readily converted into another form of protected motor, commonly known as a splash-proof motor, or vice versa. By a slight additional change, a fan-cooled motor can be converted into an explosion-resistant motor, as covered in our divisional application Serial No. 213,092, filed February 28, 1951. By a simple substitution of imperforate brackets for perforated brackets, an open motor may be converted into a totally enclosed motor.

A further object of our invention is to provide a novel arrangement of frame-parts, and axial and radial registers for the various types of interchangeable brackets, whereby a minimum amount of machining is required.

A further object of our invention is to provide a radial register or fit, which is continuous, for one type of bracket, which may be either a bracket for a fan-cooled motor or a bracket for an open motor, while having an intermittent fit for the other type of bracket, either open or fan-cooled, respectively.

A still further object of our invention is to provide a novel form of splash-proof construction, which is of the utmost simplicity and effectiveness, while being also convertible, quickly and simply, into a drip-proof construction, requiring, for such conversion, only the removal of a separate spaced hood, from each end of the motor, and turning each bracket upside down so that the air-ventilating holes, which are in the top half of each bracket for a splash-proof motor, are in the bottom half of each bracket for a drip-proof motor, the other half of the bracket being imperforate.

By way of general summary, the general object of our invention is to enable the manufacturer to produce an improved line of motors, or other dynamo-electric machines, with a minimum amount of machining which is more or less costly, and with a minimum number of standard convertible parts which have to be carried by the manufacturer. These parts can be assembled, in various combinations, to produce the maximum number of styles or types of machine, thus gaining the maximum advantage of quantity-production for those parts which are common to all types, and particularly for those parts which are utilized in the types in which the largest numbers of sales are made.

With the foregoing and other objects in view, our invention consists in the structures, combinations, systems, methods and parts, hereinafter described and claimed, and illustrated in the accompanying drawings, wherein:

Fig. 1 is a longitudinal sectional view of a form of embodiment of our invention, to provide a drip-proof motor, the motor-foot being shown in elevation;

Fig. 2 is an end view of the motor shown in Fig. 1, with the top half of the bracket cut away, and Fig. 3 is a view similar to Fig. 1, showing our motor embodied as a splashproof motor.

All forms of embodiment of our motor utilize a stator-member comprising a strong, rigid, frame-ring 7 and a stator-core assembly 8. In many cases, it is desirable that the frame-ring 7 shall constitute an imperforate enclosure-ring for the machine. The stator-core assembly 8 comprises a rigidly held stack of stator-laminations 9, which have a tight fit, known as an interference-fit, within the inside of the frame-ring 7, at a plurality of circumferentially-spaced points, as indicated at 10' in Fig. 2. It is preferable that the stator-laminations shall fit tightly enough, in the frame-ring 7, so as to readily conduct heat from the laminations to the frame-ring. At other points around their peripheries, the stator-laminations 9 are spaced from the inside of the frame-ring 7, so as to provide axially extending ventilating-spaces 11, which admit of an axial air-flow over the stator-core laminations 9, preferably, though not necessarily, extending from one end of the core straight through to the other end. The stator-core laminations carry the stator or primary windings 10, the end-turns of which are shown in Fig. 1.

The stack of stator-core laminations 9 may be held together in any desired way, so far as the broader aspects of our invention are concerned. We prefer to use the improved core-holding assembly which constitutes the subject-matter of a Patent No. 2,447,645, granted August 24, 1948, to Arthur E. Goodwin and Leon R. Ludwig. It is sufficient to say that the stator-laminations 9 are held between two end-plates 13, which are held tightly compressed against the laminations, by means of a plurality of circumferentially-spaced, elongated, axially disposed lamination-holding members, which are shown as locking-bars 14. The end-plates 13 do not make a tight fit with the inside of the frame-ring 7, but are welded to the inside of the frame-ring, after the core-member is assembled in the ring, at a plurality of circumferentially spaced points, as indicated at 15 in Fig. 2. The remaining peripheral portions of the end-plates are spaced from the inside of the frame-ring 7, to provide the aforementioned axial ventilating spaces 11.

After the stator-frame has been assembled, as above described, two fits are machined on each end of the frame, these four machining operations being advantageously performed simultaneously. One of these fits is in the frame-ring 7, both ends of which are rabbeted, to provide an accurate radial-register surface 16, and an accurate axial-register surface 17. The other fit is on the stator end-plates 13, the exposed end-faces of each of which are machined, to provide an accurate axial-register surface 18, as shown in Figs. 1, 3 and 4.

The stator part of the motor shown in Figs. 1 and 2 also includes two identical brackets 20, removably mounted on the frame-ring 7, one at each end. These brackets may be either imperforate, for a totally enclosed motor, or, as shown in Figs. 1 and 2, they may be perforated, for an open, protected motor. Each perforated bracket 20 has a series of ventilating-holes 21 in one hemisphere of the bracket. In Figs. 1 and 2, the brackets are applied to the stator-frame in such position that the ventilating-openings or air-holes 21 are in the bottom half or hemisphere of each bracket, so that the top half of each bracket is imperforate, rendering the motor drip-proof. The brackets 20 are secured in place by means of bolts 22 which engage in the ends of the respective locking-bars 14.

Each bracket 20 carries bearings 23 for supporting the rotor-shaft 24. In the particular motor which is shown in the drawings, the bearings 23 are ball-bearings, in which the stator part 25 of the bearing is permanently assembled with the rotating bearing-part 26 which is fixed to, or carried by, the shaft 24, so that the shaft-mounted bearing-part 26 has to be pressed on or off the shaft, whenever a bracket 20 is applied to, or removed from, the machine, or, if the ball-bearing part 26 is left attached to the shaft, then the stationary bearing-part 25 has to be moved in or out of the bearing housing 23, when the bracket is applied to, or removed from, the machine. At any rate, the two rotating bearing-parts 26, at the two ends of the machine, are at a fixed distance apart, said distance being fixed by the particular shaft 24 which is utilized.

The motor which is shown in Figs. 1 and 2 is completed by a rotor-member which is carried by the motor-shaft 24. The rotor is characterized by a rotor core-member 28, and suitable fan-means for ventilating the machine. In the particular form of motor which is illustrated, a cast squirrel-cage rotor is utilized, having end-rings which are shown at 30, and a plurality of fan-vanes 32, projecting axially from each of the end-rings 30. These fan-vanes 32 are not necessary, or even helpful, in a drip-proof or splash-proof machine, shown in Figs. 1 and 3, respectively, but they are definitely needed in the fan-cooled motor as covered in our first-mentioned divisional application, and we use the fan-vanes in all types so that the same rotor can be used in all types.

In order to obtain adequate ventilation of a protected type of motor, such as is shown in Figs. 1, 2 and 3, it is desirable to provide internal fan-means for producing an axial flow of air through the ventilating-spaces 11 between the outer periphery of the stator-core 9 and the inside of the frame-ring 7, causing air to be drawn into the machine through the air-vents 21 in one of the brackets 20, and to be expelled from the machine through the ventilating vents 21 in the bracket 20 at the other end of the machine. This axial ventilation of the machine requires a considerable amount of blower-pressure, and any suitable type of blower-means may be utilized for this purpose.

In Figs. 1, 2 and 3, the particular internal blower, which is shown, is an old type of blower having a plurality of outwardly directed fan-blades 34, mounted on a hub 35 which is pressed on the shaft 24, or otherwise removably secured thereto. In order to create sufficient static head, it is necessary for the axial-flow fan or blower 34 to have an outer or peripheral diameter which is larger than the diameter of the rotor-core 28, and this imposes a practical limitation that such an over-diameter blower 34 can be utilized at only one end of the rotor-core 28. Thus, in assembling the rotor-member, including the rotor-core 28 and the shaft 24, and all parts carried thereby, it is possible to insert the entire rotor-assembly into the bore of the stator-core 9, from one end thereof, this being possible because the axially extending vanes 32, which project from the rotor end-rings 30, have an outer diameter which is less than the diameter of the rotor-core 28. After the rotor is assembled, the bracket 20, at the fan-end of the machine, may be put into place.

In the operation of the drip-proof, or protected, open motor, which is shown in Figs. 1 and 2, it will be noted that the critical portion of the motor, so far as temperature is concerned, is the stator or primary member, and that heat is withdrawn from the primary windings 10 in two ways, partly by heat-radiation from the end-turns of these windings, and partly through the stator-laminations 9 to the outer periphery of these laminations, from which heat is withdrawn in two ways, both by reason of the axially flowing ventilating-air which passes over the outer periphery of these laminations, through the axial ventilating-spaces 11, and also through heat-conduction to the frame-ring 7, at the points 19' where the stator-laminations 9 come into tight engagement with the inside of the frame-ring 7, and heat is withdrawn from the frame-ring 7, both by the internal axially flowing ventilating-stream, in the ventilating-spaces 11, and also by radiation to the ambient atmosphere, from the outside of the machine.

The straight vanes 32, close to the ends of the rotor-core 28, cause a cooling air-stream to flow out radially over the end-turns of the primary windings 10, as indicated by the arrows 38. The axial air-flow, induced by the fan-blades 34, is indicated by the arrows 39. It will be noted that the axial air-flow 39 is so directed that it passes at least partially over both of the bearings 23, so as to cool the bearings. The axially directed air-flow 39 may also be so directed as to cool the primary end-turns 10, or to assist in cooling the same. It is further noted, in the drip-proof machine which is shown in Fig. 1, that the inlet and outlet openings 21, for this axially flowing ventilation, are disposed in the bottom hemispheres of the brackets 20, so that any liquid dripping on the motor will not get inside the motor, thus rendering the motor drip-proof.

An important feature of our invention is the provision of a convertible motor, or a series of motors of different types, particularly different types as regards ventilation and the degree of enclosure, while necessitating the carrying of a minimum number of parts by the manufacturer, thus gaining the advantage of a large quantity-production of those parts which are common to many different types of motors, particularly those types in which the demand is the largest, and also providing a more pleasing line of motors, having greater uniformity of appearance. The objects of our invention also have to do with making the various types of motors have the minimum size possible, for any given rating, and this particular phase of our objects is carried out by utilizing a uniform method of heat-extraction for all of the different types of motors, as symbolized by the two different series of ventilating-arrows 38 and 39 in Fig. 1.

To convert the drip-proof motor of Fig. 1 into a splash-proof motor of Fig. 3, all that is necessary is to turn the two brackets 20 of Fig. 1 upside down, so that the air-vents 21 are in the top hemispheres of the brackets 20, as shown in Fig. 3. The splash-proof design is then completed by the simple addition of a separate spaced hood or guard 40 at each end of the machine, said guards having openings or air-vents 41 in their lower portions. Each guard 40 has a peripheral portion which makes a substantially continuous fit on its end of the frame-member of the machine. The guards are held in place by any suitable set-screws 42.

It will be noted that the splash-proof design shown in Fig. 3 is novel in its extreme simplicity, in its pleasing appearance, which is not greatly different from an ordinary or drip-proof motor-construction, such as that shown in Fig. 1, and by its complete effectiveness for a splash-proof design. The essential feature of a splash-proof design is to prevent the entry of liquid or solid particles into the machine, either directly, or by striking and running along a surface, when the drops of liquid or the solid particles either fall on the machine or come towards it in a straight line at any angle not greater than 100° from the vertical. It will be noted that our combination of lower-opening guard 40, and upper-opening bracket 20, in Fig. 3 causes any water, attempting to get into the machine, to follow a broken path, before it can get into the interior of the motor, thus effectually preventing the entrance of water, through splashing from the floor, or otherwise. At the same time, the ventilating-air is freely admitted, as shown by the arrows.

While we have shown our invention in forms of embodiment which are at present preferred, we desire it to be understood that our invention is susceptible of a wide variety of application and adaptation. We desire, therefore, that our appended claim shall be accorded the broadest construction consistent with its language.

We claim as our invention:

A convertible splash-proof dynamo-electric machine, comprising a centrally disposed stator-member having an imperforate enclosure-member around the machine, and a rotor having a shaft, a rotor-core member carried by the shaft, and axial-flow, internally mounted fan-means, in combination with two bearing-supporting brackets removably and reversibly mounted on the stator-member, one at each end, each bearing-supporting bracket having a bearing for supporting the shaft at that end of the machine, and each bearing-supporting bracket being imperforate in its lower half, and having one or more air-holes in its upper half, the same two brackets being reversible so as to be turned upside down, so that the air-holes are in the lower halves, plus a spaced hood, covering the upper half and some of the bottom half of each bracket, for making the machine splash-proof.

LEON R. LUDWIG.
THEODORE C. FOCKLER.
WILLIAM H. FORMHALS.
HOWARD T. WALTON.

REFERENCES CITED

The following references are of record in the file of this patent:

UNITED STATES PATENTS

| Number | Name | Date |
| --- | --- | --- |
| 1,932,286 | Smith | Oct. 24, 1933 |
| 2,017,255 | Norton | Oct. 15, 1935 |
| 2,055,931 | Keely | Sept. 29, 1936 |
| 2,185,740 | Smith | Jan. 2, 1940 |
| 2,357,923 | Anderson | Sept. 12, 1944 |
| 2,381,914 | Leflar | Aug. 14, 1945 |